US009111484B2

(12) United States Patent
Bhrugumalla (10) Patent No.: US 9,111,484 B2
(45) Date of Patent: Aug. 18, 2015

(54) ELECTRONIC DEVICE FOR SCENE EVALUATION AND IMAGE PROJECTION ONTO NON-PLANAR SCREENS

(71) Applicant: Semiconductor Components Industries, LLC, Phoenix, AZ (US)

(72) Inventor: Satish Kumar Bhrugumalla, Fremont, CA (US)

(73) Assignee: Semiconductor Components Industries, LLC, Phoenix, AZ (US)

(*) Notice: Subject to any disclaimer, the term of this patent is extended or adjusted under 35 U.S.C. 154(b) by 21 days.

(21) Appl. No.: 13/875,100

(22) Filed: May 1, 2013

(65) Prior Publication Data

US 2013/0293732 A1 Nov. 7, 2013

Related U.S. Application Data

(60) Provisional application No. 61/642,149, filed on May 3, 2012.

(51) Int. Cl.
| | |
|---|---|
| H04N 5/232 | (2006.01) |
| G06F 3/01 | (2006.01) |
| G09G 5/30 | (2006.01) |
| G06F 3/0346 | (2013.01) |
| H04N 5/225 | (2006.01) |

(52) U.S. Cl.
CPC .. *G09G 5/30* (2013.01); *G06F 3/01* (2013.01); *G06F 3/017* (2013.01); *G06F 3/0346* (2013.01); *H04N 5/2258* (2013.01); *H04N 5/232* (2013.01); *H04N 5/23293* (2013.01)

(58) Field of Classification Search
CPC ................................. H04N 5/232; G06F 3/017
See application file for complete search history.

(56) References Cited

U.S. PATENT DOCUMENTS

| | | | |
|---|---|---|---|
| 6,597,410 B1 * | 7/2003 | Doany et al. .................. 348/744 |
| 7,652,717 B2 | 1/2010 | Enge et al. | |
| 7,719,606 B2 | 5/2010 | Wallace | |
| 2005/0030486 A1 * | 2/2005 | Lee et al. ........................ 353/69 |
| 2007/0047803 A1 | 3/2007 | Nikkanen | |
| 2007/0201863 A1 * | 8/2007 | Wilson et al. ................. 396/429 |
| 2009/0027514 A1 * | 1/2009 | Katano ..................... 348/223.1 |
| 2009/0091711 A1 * | 4/2009 | Rivera ........................... 353/28 |

(Continued)

OTHER PUBLICATIONS

Yamanaka et al., "Adaptive Image Projection onto Non-planar Screen using Projector-Camera Systems," 2010 International Conference on Pattern Recognition.

*Primary Examiner* — Lin Ye
*Assistant Examiner* — John H Morehead, III
(74) *Attorney, Agent, or Firm* — Treyz Law Group; Kendall P. Woodruff (57) ABSTRACT

An electronic device may have one or more imaging sensors. The imaging sensors may be used in combination with an optional mechanical gesture to analyze the lighting conditions of the environment around the electronic device. The electronic device may set auto-exposure, auto-white balance, and auto-focus settings based on the analysis. The electronic device may include a shaped display. The imaging sensors may be used in calibration of a projector for the shaped display and may be used in sending touch inputs associated with the shaped display. The electronic device may be able to capture a photograph during video capture. The electronic device may generate a display screen that identifies which portions of the scene being imaged correspond to the video and which portions correspond to the photograph.

6 Claims, 6 Drawing Sheets

(56) References Cited

U.S. PATENT DOCUMENTS

| | | |
|---|---|---|
| 2010/0085442 A1* | 4/2010 | Yamashita et al. ......... 348/222.1 |
| 2010/0158099 A1 | 6/2010 | Kalva et al. |
| 2011/0109727 A1* | 5/2011 | Matsuura ...................... 348/47 |
| 2012/0038747 A1* | 2/2012 | Kim et al. ...................... 348/47 |
| 2012/0139904 A1* | 6/2012 | Lee et al. ..................... 345/419 |
| 2012/0194419 A1* | 8/2012 | Osterhout et al. ............ 345/156 |
| 2012/0287243 A1* | 11/2012 | Parulski ........................ 348/46 |
| 2012/0329528 A1* | 12/2012 | Song ............................ 455/566 |
| 2013/0250062 A1* | 9/2013 | Tin ................................ 348/46 |
| 2014/0036040 A1* | 2/2014 | Takane ......................... 348/47 |
| 2014/0045571 A1* | 2/2014 | Ryan ............................ 463/20 |
| 2014/0063054 A1* | 3/2014 | Osterhout et al. ............ 345/633 |

\* cited by examiner

ELECTRONIC DEVICE FOR SCENE EVALUATION AND IMAGE PROJECTION ONTO NON-PLANAR SCREENS

This application claims the benefit of provisional patent application No. 61/642,149, filed May 3, 2012, which is hereby incorporated by reference herein in its entirety.

BACKGROUND

The present invention relates to imaging systems and, more particularly, to imaging systems that may use scene evaluation in improving image quality, imaging systems that may be used in supporting shaped displays, and imaging systems that simultaneously capture images having multiple aspect ratios.

Electronic devices such as cellular telephones are often provided with camera sensors. When capturing an image (and when capturing video), the camera sensors may, as examples, perform auto-white balance, auto-exposure, and auto-focus processes. The trio of auto-white balance, auto-exposure, and auto-focus processes may sometimes be referred to as a 3A convergence process. Typically, the 3A convergence process involves capturing a low-resolution preview image and then analyzing that image to determine appropriate imager settings for white balance, exposure, and focus. Once appropriate imager settings are determined, a camera sensor can capture a full-resolution image using the automatically selected settings. The dependence of traditional camera sensors on a single preview image limits image quality, as the image settings derived from that single preview image are often not optimal.

Traditional displays and touch surfaces are rigid (i.e., non-flexible), planar, and rectangular in shape. Display and touch surface designers are therefore unable to provide displays that are flexible, non-planar, and/or non-rectangular (e.g., randomly-shaped displays).

DETAILED DESCRIPTION

Figure 1:
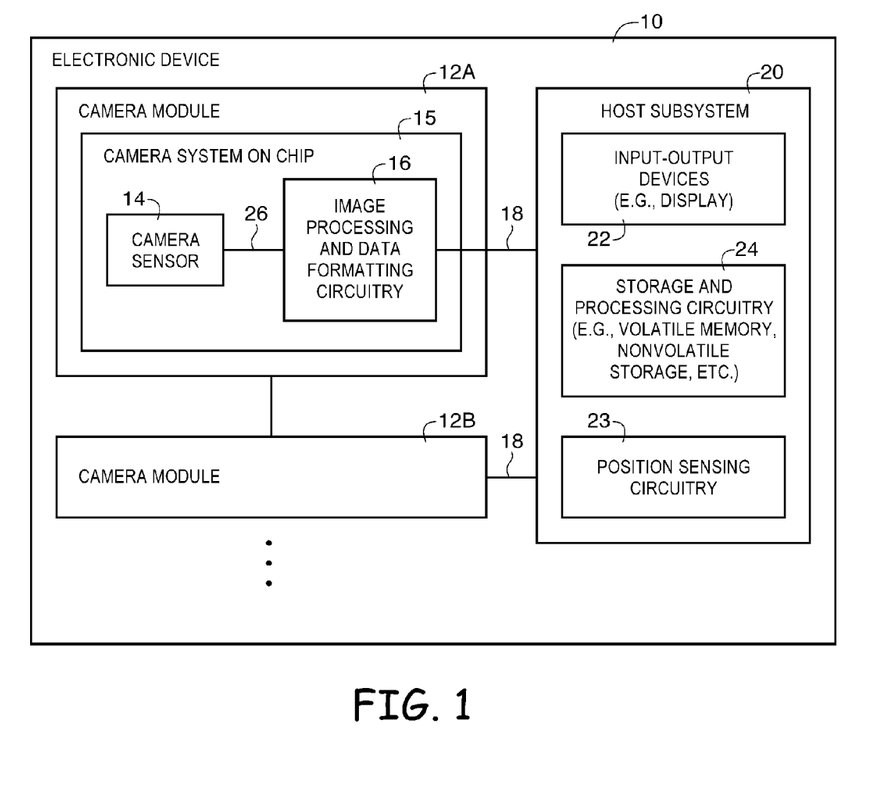
FIG. 1 is a diagram of an electronic device and computing equipment that may be used in producing images with decreased depth of field in accordance with embodiments of the present invention.

Digital camera modules are widely used in electronic devices. An electronic device with a digital camera module is shown in FIG. 1. Electronic device 10 may be a digital camera, a laptop computer, a display, a computer, a cellular telephone, or other electronic device. Device 10 may include one or more imaging systems such as imaging systems 12A and 12B (e.g., camera modules 12A and 12B) each of which may include one or more image sensors 14 and corresponding lenses. During operation, a lens focuses light onto an image sensor 14. The lens may have fixed aperture. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon. In at least some arrangements, device 10 may include two (or more) image sensors 14, which may capture images from different perspectives. When device 10 includes two image sensors 14, device 14 may be able to capture stereo images.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

In a typical arrangement, which is sometimes referred to as a system on chip or SOC arrangement, camera sensor 14 and image processing and data formatting circuitry 16 are implemented on a common integrated circuit 15. The use of a single integrated circuit to implement camera sensor 14 and image processing and data formatting circuitry 16 can help to minimize costs. If desired, however, multiple integrated circuits may be used to implement circuitry 15. In arrangements in which device 10 includes multiple camera sensors 14, each camera sensor 14 and associated image processing and data formatting circuitry 16 can be formed on a separate SOC integrated circuit (e.g., there may be multiple camera system on chip modules such as modules 12A and 12B). Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry, radio-frequency-based positioning circuitry (e.g., cellular-telephone positioning circuitry), gyroscopes, accelerometers, compasses, magnetometers, etc.

Figure 2:
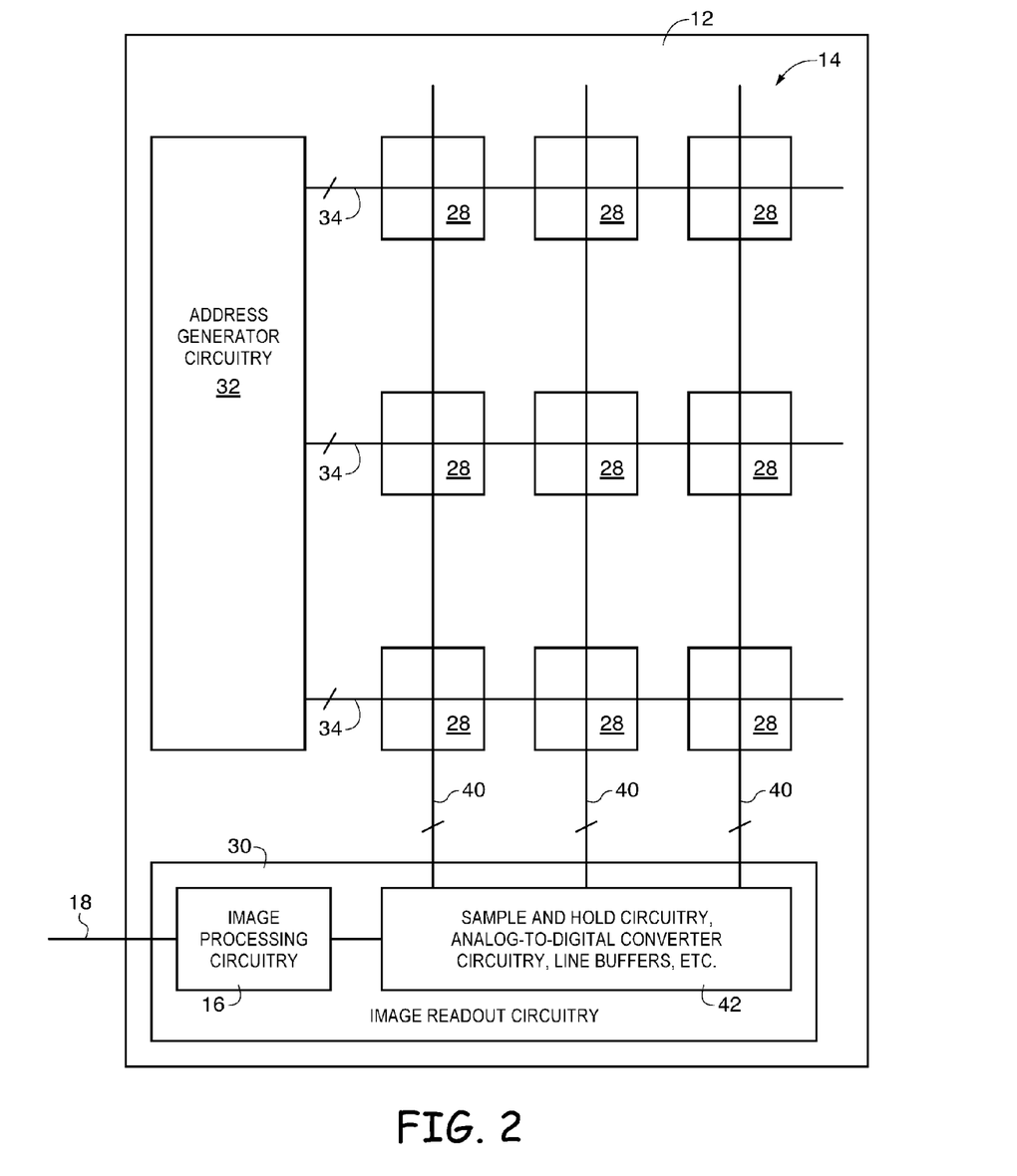
FIG. 2 is a diagram of an illustrative array of light-sensitive imaging pixels and control circuitry coupled to the array of pixels that may form a camera sensor such as the camera sensor of FIG. 1 in accordance with embodiments of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Signals 34, generated by address generator circuitry 32 as an example, may include signals that dynamically adjust the resolution of array 14. For example, signals 34 may include binning signals that cause pixels 28 in a first region of array 14 to be binned together (e.g., with a 2-pixel binning scheme, with a 3-pixel binning scheme, or with a pixel binning scheme of 4 or more pixels) and that cause pixels 28 in a second region of array 14 to either not be binned together or to be binned together to a lesser extent than the first region. In addition, signals 34 may cause pixels 28 in any number of additional (e.g., third, fourth, fifth, etc.) regions of array 14 to be binned together to any number of different, or identical, degrees (e.g., 2-pixel binning schemes, 3-or-more-pixel binning schemes, etc.).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
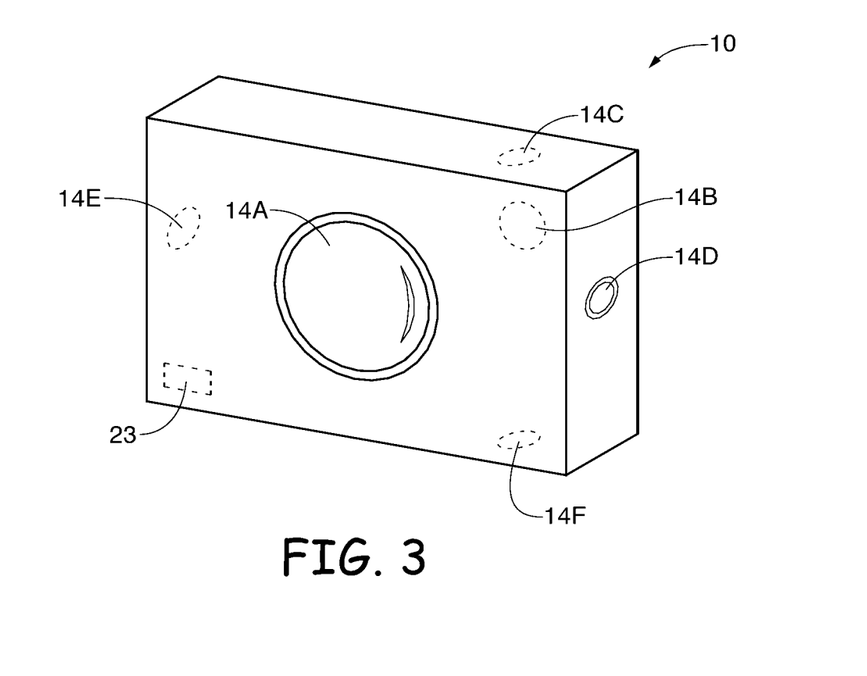
FIG. 3 is a perspective view of an illustrative electronic device that may have one or more image sensors and that may analyze and may monitor its surrounding environment using the image sensors in accordance with embodiments of the present invention.

As shown in FIG. 3, electronic device 10 may include one or more camera sensors such as camera sensors 14A, 14B, 14C, 14D, 14E, and 14F. As examples, camera sensor 14A may be a primary camera sensor located on a first side (e.g., a front side) of device 10 and camera sensors 14B, 14C, 14D, 14E, and 14F may be secondary camera sensors located on second, third, fourth, fifth, and sixth sides, respectively (e.g., rear, top, left, right, and bottom sides, respectively).

At least in arrangements in which electronic device 10 includes multiple camera sensors 14 located on at least two different sides of device 10, the camera sensors may be used in analyzing and monitoring the environment surrounding device 10. Consider, as an example, an arrangement in which device 10 includes front facing camera sensor 14A and rear facing camera sensor 14B. In such an arrangement, device 10 can use camera sensors 14A and 14B (and/or any other camera sensors present in device 10) in studying the scene about to be imaged (or being imaged) by camera sensor 14A and in studying the environment around device 10. Sensors 14A and 14B may be used to determine the location of light sources in the environment around device 10, to identify characteristics of those light sources (e.g., the color temperature of the light sources, the color profile of the light sources, whether and how the light sources are moving within the environment around device 10, the brightness of the light sources, etc.). With this information, device 10 can automatically optimize imager settings such as exposure, white balance, and focus for the image sensors of device 10 (e.g., for a primary sensor such as sensor 14A), to maximize the quality of images captured by device 10.

With some suitable arrangements, device 10 may utilize a mechanical movement or gesture when obtaining information about its surrounding environment with one or more camera sensors. As an example, in an arrangement in which device 10 includes a single camera sensor 12A, device 10 may, prior to capturing images, prompt a user of device 10 to rotate device 10 (e.g., in a full 360 degree rotation, or in another suitable motion). In this example, the prompt presented by device 10 may instruct the user to hold device 10 out at arm's length and spin around in a full circle. While device 10 is moving (e.g., rotating), device 10 can use camera sensor 12A (and any additional sensors present) to determine the lighting characteristics of its surrounding environment. If desired, sensor 12A and any additional sensors present may operate in a high speed image capture mode when device 10 is utilize a mechanical gesture to analyze its surrounding environment. As another example, in an arrangement in which device 10 includes a front camera sensor 12A and a rear camera sensor 12B, a 180 degree rotation may be sufficient. In general (e.g., in single or multi-camera systems), it may be desirable for the motion of device 10 to include sufficient motion for device 10 to analyze its surrounding environment (e.g., a full spherical analysis of the environment around device 10, a partial spherical analysis of the environment around device 10, a partial spherical analysis of the environment around device 10 including a half-sphere of the region above device 10, etc.).

If desired, information on the environment surrounding device 10 may be cached (i.e., stored) for later use. As an example, when device 10 determines the lighting characteristics of its surrounding environment, those lighting characteristics may be used to determine appropriate 3A settings for images captured shortly thereafter. In addition, data on the lighting characteristics for a particular location (which may be a location frequented by device 10) may be stored and, whenever device 10 returns to that particular location (as determined by position sensing circuitry 24 or by user input) the stored data may be used to determine appropriate 3A settings.

In at least some arrangements, device 10 may combine information from the sensors of FIG. 3 with information from additional sensors such as position sensing circuitry 17. As an example, device 10 may use sensors 14A and 14B to determine the location of the sun in an outdoor environment. Device 10 may then use sensors such as an accelerometer to determine that device 10 is moving within the outdoor environment. Device 10 may then be able to track the changing position of the sun relative to device 10 without having to continually determine the position of the sun from the camera sensors 14 of device 10. In such arrangements, device 10 may periodically reestablish the position of the sun using the camera sensors 14 of device 10, to ensure that any drift errors from the accelerometer do not accumulate over time. Such arrangements may allow device 10 to automatically and continually adjust its 3A settings (auto-white balance, auto-focus, and auto-exposure).

In general, device 10 may use any available sensors and inputs such as global positioning system (GPS) circuitry, accelerometers, compasses, magnetometers, clocks, etc. to determine the location of device 10 and lighting conditions around device 10. As examples, GPS circuitry may be used to determine if device 10 is traveling in a vehicle, accelerometer circuitry may be used to determine if device 10 is rotating (e.g., is on a carousel or is otherwise being rotated), and the location of the sun relative to device 10 based on the current time, date, compass settings, and location.

Figure 4:
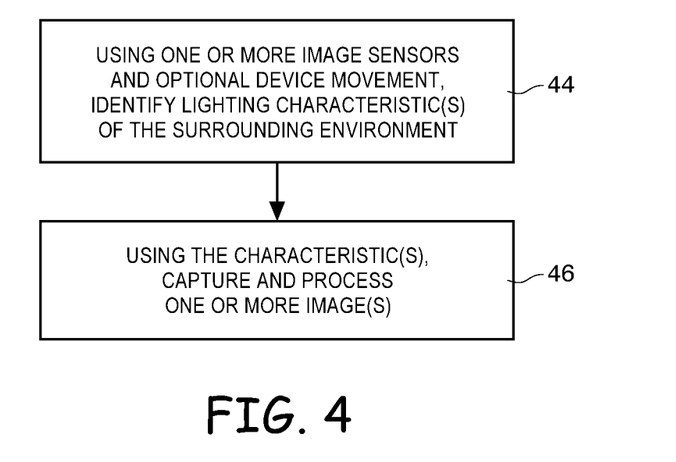
FIG. 4 is a flowchart of illustrative steps involved in using camera sensor(s) such as the camera sensor(s) of FIG. 3 and an optional device movement in analyzing the surrounding environment and capturing at least one image in accordance with embodiments of the present invention.

A flowchart of illustrative steps involved in using one or more camera sensors 14 and/or sensors such as circuitry 23 in analyzing the environment around device 10 (e.g., the lighting conditions) and capturing an image are shown in FIG. 4.

In step 44, device 10 may use image sensors such as sensors 14A, 14B, 14C, 14D, 14E, and 14F and/or sensors such as GPS circuitry, accelerometers, clocks, compasses, magnetometers, etc. to identify lighting characteristics of the environment around device 10 (which is about to be imaged by device 10). If desired, step 44 may involve movement of device 10 by a user (e.g., a 360 degree, 180 degree, or other mechanical movement of device 10). For example, device 10 may use information from these sensors to determine the locations of light sources in the environment, the brightness of light sources in the environment, the color temperature of light sources in the environment, whether any of the light sources are moving relative to device 10, whether the brightness and/or color temperature of any of the light sources are changing, etc.

In step 46, device 10 may use information gather in step 46 to identify suitable 3A settings for one or more camera sensors and may capture and process one or more images using the camera sensors using those 3A settings. The 3A setting may include one or more of an auto-exposure setting, an auto-white balance setting, and an auto-focus setting. As an example, in an arrangement in which device 10 determined in step 44 that the scene to be imaged in step 46 is an outdoor scene at sunset with the sun behind device 10, device 10 may set its 3A settings to optimize picture quality for any images captured in step 46.

Figure 5:
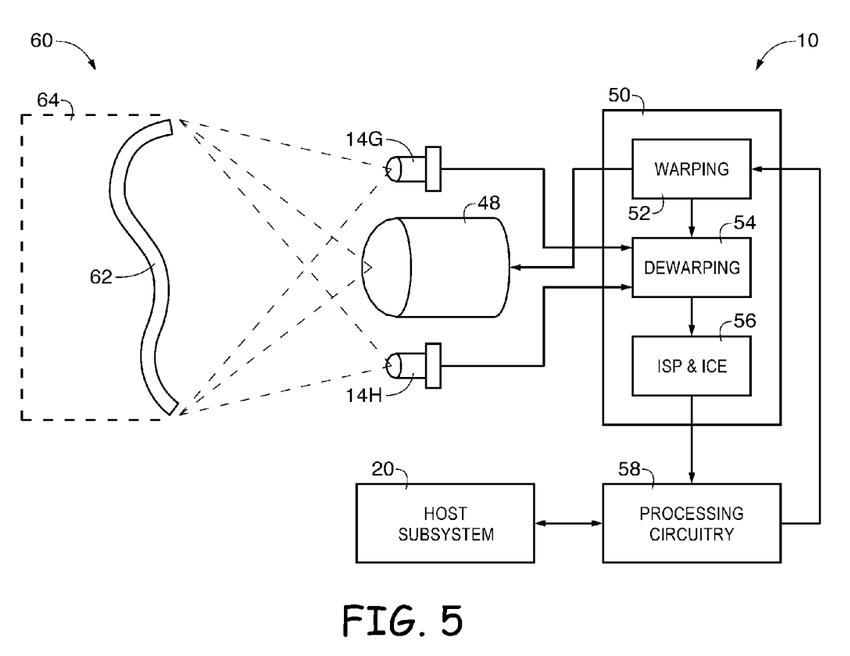
FIG. 5 is a diagram of an illustrative shaped display that may be touch sensitive and optical components such as camera sensors that may be used in supporting the shaped display and optional touch sensing capabilities in accordance with embodiments of the present invention.

If desired, electronic device 10 may include a shaped display such as display 60 having a shaped screen 62 of FIG. 5 (e.g., an input-output device 22) and device 10 may include camera sensors such as camera sensors 14G and 14H for calibration of shaped display 60 and/or for sensing touch inputs on shaped display screen 62. Camera sensors 14G and 14H may be any suitable type of camera sensors. As an example, camera sensors 14G and 14H may be high dynamic range imaging sensors, to ensure sufficient image quality in varied lighting conditions (as may be present in an automobile, as an example). If desired, sensors 14G and 14H may be sensitive to infrared light, visible light, or infrared light and visible light, as examples. As shown in FIG. 5, shaped display 60 may be a display having a shaped screen 62 with any desired shape, including non-rectangular and/or non-planar formats. Shaped display screen 62 may, if desired, be a flexible display screen, which may facilitate formation of shaped display screen 62 into a desired shape. As one example, shaped display screen 62 may be in a dashboard in an automobile and have a non-planar and/or non-rectangular shape.

Device 10 may include projector 48; touch display processor 50 including warping engine 52, dewarping engine 54, and image signal processing (ISP) and image computational (ICE) engine 56, and processing circuitry 58.

With at least some arrangements, the projection of images onto the shaped screen 62 may be accomplished using warping engine 54 (in addition or alternatively, projector 48 may include lens structures that at least partially warp the projected image). In particular, projector 48, if driven with non-warped display signals, may require a substantially planar and/or rectangular display screen for proper operation (e.g., for the display to be in focus and to scale across the entire display screen). Therefore, in arrangements of the present invention in which display screen 62 is non-planar and/or non-rectangular, projector 48 may be driven with warped display signals that ensure that images projected onto screen 62 are in focus and to scale across the entirety of the active portion of screen 62. In other words, since display screen 62 is "warped" from a traditional rectangular and planar display screen, the output of projector 62 may also be warped (using warping engine 52) to compensate for the "warping" (from the rectangular and planar norms) of display screen 62.

Camera sensors 14G and 14H may be used in calibrating warping and dewarping engines 52 and 54. Calibration operations may be performed at any desired time. As an example, calibration operations may be performed upon power up of device 10. In arrangements in which curved display 60 may be powered up after (e.g., separate from) powering up device 10, calibration operations may be performed upon power up of curved display 60. Calibration operations may include projecting a known pattern (such as predetermined grid lines) with projector 48, imaging the projected pattern using camera sensors 14G and 14H, and analyzing the images from sensors 14G and 14H to determine appropriate warping and dewarping settings for engines 52 and 54. If desired, calibration operations may involve an iterative process that repeats until the projected pattern fits onto curved display screen 62 correctly (e.g., is in focus and to scale across the entirety of the display screen).

Alternatively or in addition to calibration operations, camera sensors 14G and 14H may be used in sensing touch inputs on shaped display screen 62. In particular, during normal operation sensors 14G and 14H, dewarping engine 54 and circuitry 56 may identify user touch inputs on the surface of display screen 62, including the location of the inputs within the display screen 62. When touch inputs are detected, circuitry such as circuitry 56 and 58 may provide appropriate command information to host subsystem 20. If desired, camera sensors 14G and 14H may be configured to capture stereo images. In such arrangements, camera sensors 14G and 14H, dewarping engine 54, and circuitry 56 may identify user input in a projected space 64 in front of the display screen 62. In general, curved display 60 can perform calibration operations and/or identify touch inputs even in arrangements in which display 60 includes only a single camera sensor such as sensor 14G.

Figure 6:
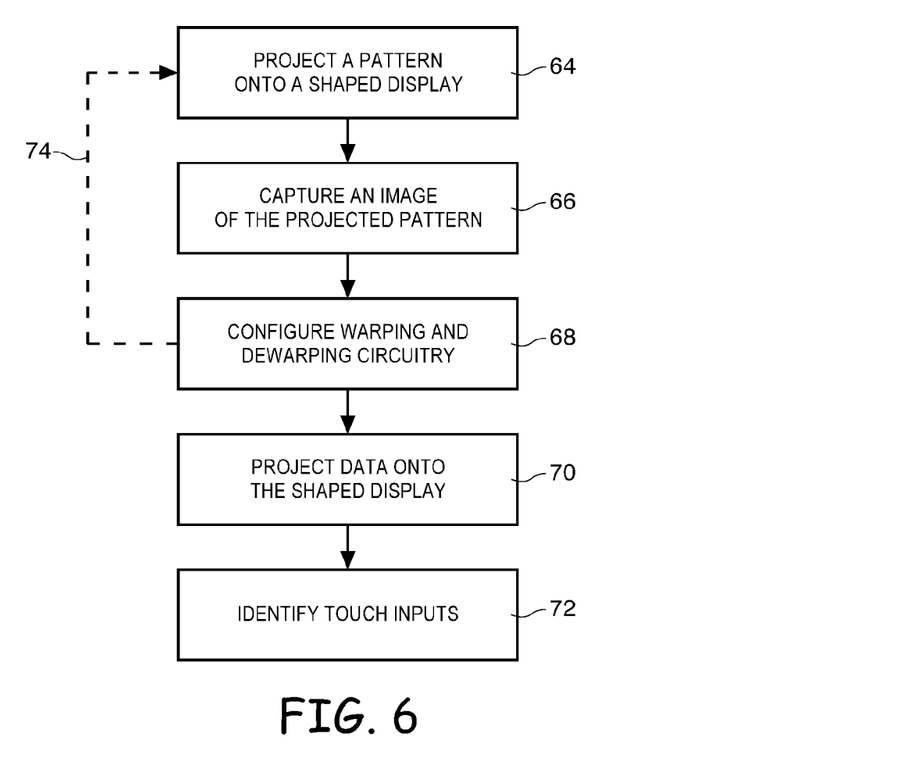
FIG. 6 is a flowchart of illustrative steps involved in calibrating a project displaying images onto a shaped display and identifying touch inputs on the shaped display in accordance with embodiments of the present invention.

A flowchart of illustrative steps involved in calibrating a shaped display such as shaped display 60 and identifying touch inputs on the shaped display are shown in FIG. 6.

In step 64, a known pattern may be projected onto the shaped display. As an example, projector 48 nay project a predetermined pattern such as an array of parallel lines (e.g., grid lines) onto shaped display screen 62.

In step 66, one or more image sensors may capture one or more images of the projected pattern. For example, camera sensors 14G and 14H may capture one or more images of the pattern projected onto screen 62 in step 64.

In step 68, differences between the projected pattern (as imaged in step 66) and the expected pattern (e.g., the desired appearance of the pattern when projected onto screen 62) may be determined and appropriate warping and dewarping settings generated. The generated warping and dewarping settings may be used to configure engines 54 and 56.

As illustrated by dashed lines 74, the processes of steps 64, 66, and 68 may be repeated. As an example, the processes of steps 64, 66, and 68 may be repeated as part of an iterative process that repeats until the differences between the projected pattern (as imaged in step 66) and the expected pattern are less than a predetermined threshold. Alternatively or in addition, the processes of steps 64, 66, and 68 may be repeated periodically. Such an arrangement may be beneficial in embodiments in which display screen 62 is flexible and/or subject to warping over time.

In step 70, images (e.g., data) may be projected onto display screen 62 by projector 48. The projected data may be appropriately warped by warping engine 52 such that the projected images are in-focus, to-scale, and fill the active region of display screen 62.

In step 72, one or more camera sensors such as camera sensors 14G and 14H may be used to identify touch inputs on the surface of display screen 62 (or in region 64 in front of display screen 62). As an example, camera sensors 14G and 14H, together with dewarping engine 54 and circuitry 56 and 58 may be used to identify shadows on the surface of display screen 62 indicative of a user's finger pressing against a portion of display screen 62.

Figure 7:
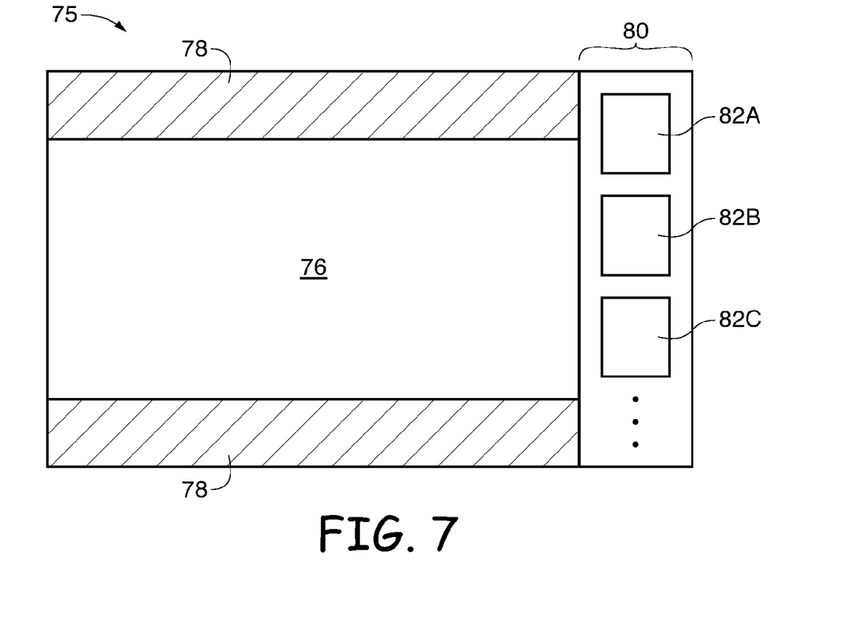
FIG. 7 is a diagram of an illustrative screen that may be displayed on an electronic device as part of simultaneously capturing multiple images having different aspect ratios in accordance with embodiments of the present invention.

In accordance with various embodiment of the present invention, device 10 may include a camera sensor 14 capable of simultaneously capturing images having different aspect ratios and may include a display that facilitates the simultaneous capture of images having different aspect ratios. As an example, camera 14 may be used in capturing video in a first format (e.g., a widescreen 16:9 format or any other suitable format) and, without interrupting video capture operations, camera 14 may take a photograph in a second format (e.g., a snapshot in a 4:3 format or any other suitable format. With some suitable arrangements, the simultaneous capturing of images having different aspect ratios may be accomplished with a high speed camera sensor 14 capable of capturing the photograph in-between adjacent frames of the video. In order to assist a user of device 10 in simultaneously capturing images having different aspect ratios, device 10 may include a display (e.g., an input-output device 22, a shaped display 60, etc.) that displays screen 75. Display screen 75 may display real-time previews of images being captured or images that could be captured by one or more image sensors in device 10. Display screen 75 may include a central region 76 in the first format (e.g., the widescreen 16:9 format) and additional regions 78 that, in combination with the central region 76, are in the second format (e.g., the 4:3 snapshot format). If desired, the additional regions 78 may be presented in such a way as to identify to the user that the regions 78 are not part of the video format but are part of the photograph format. As examples, the additional regions 78 may be dimmed relative to the central region 76 and/or the additional regions 78 may be alpha blended to provide a semi-transparent appearance to regions 78. Both regions 76 and 78 may be filled with image data of a scene being imaged by camera sensor 14 of device 10.

If desired, display screen 75 may include a side frame 80 include one or more user-selectable icons such as icons 82A, 82B, and 82C. As examples, icon 82A may be an icon allowing a user to start and stop (or pause) a video record, icon 82B may be an icon allowing a user to take a single (or multiple) photograph, and icon 82C may be an icon that enables and disables the dimming and/or alpha blending of the additional regions 78.

Figure 8:
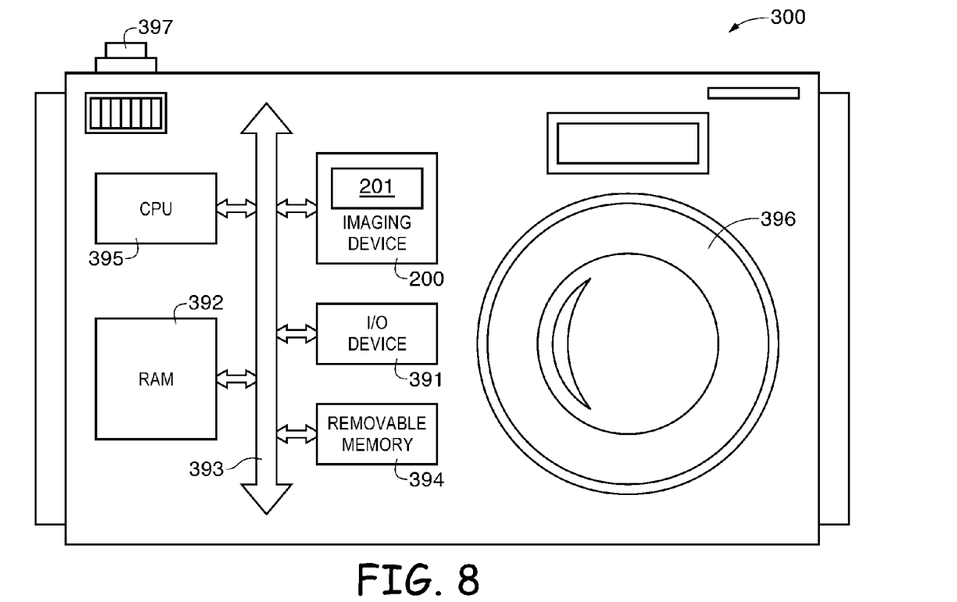
FIG. 8 is a block diagram of an imager employing one or more of the embodiments of FIGS. 1-7 in accordance with embodiments of the present invention.

FIG. 8 illustrates a simplified block diagram of imager 200 (e.g., an imager that may analyze its surrounding environment to determined 3A settings, that may support a shaped display, and that may simultaneously capture video and photographs having different aspect ratios). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst-Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 9:
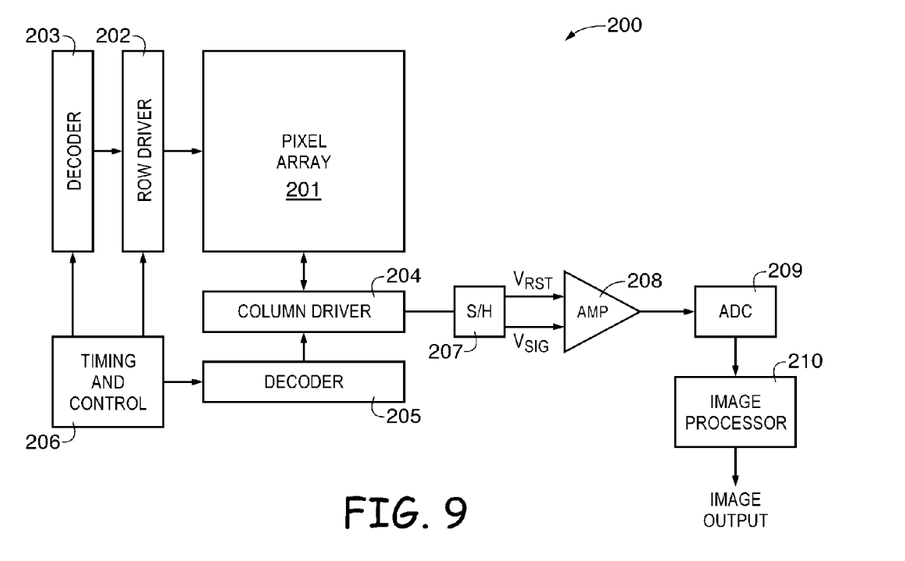
FIG. 9 is a block diagram of a processor system employing the imager of FIG. 8 in accordance with embodiments of the present invention.

FIG. 9 shows in simplified form a typical processor system 300, such as a digital camera, which includes an imaging device such as imaging device 200 (e.g., an imager that may analyze its surrounding environment to determined 3A settings, that may support a shaped display, and that may simultaneously capture video and photographs having different aspect ratios). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems that may use scene evaluation in improving image quality, imaging systems that may be used in supporting shaped displays, and imaging systems that simultaneously capture video and photographs having different ratios.

An imaging system may be used to identify lighting characteristics of its surrounding environment. As an example, an imaging system may use one or more camera sensors together with an optional mechanical gesture to identify the locations and color temperature of light sources and other lighting characteristics of the surrounding environment. After determining the lighting characteristics of the surrounding environment, the imaging system may use the determined lighting characteristics is generating imager settings such as auto-exposure, auto-white balance, and auto-focus settings. The determined lighting characteristics may be stored for later use, which may be especially beneficial if the imaging system frequently captures images in on or more favorite locations.

An imaging system may be used in supporting a shaped display. The imaging system may be used in calibrating warping and dewarping engines for the shaped display, such that images projected into a shaped display screen are properly displayed. In addition or alternatively, the imaging system may be used in identifying user touch input on the shaped display screen and/or user spatial input in front of the shaped display screen.

An imaging system may be capable of capturing video in a first format and, while capturing the video, capturing a photograph in a second format. The imaging system may be incorporated into an electronic device having a display. The display may be configured to display a screen including a preview of the video in the first format and a preview of the photograph in the second format, where some portions of the photograph have been altered to visually distinguish portions of the second format that do not overlap with portions of the first format.

The foregoing is merely illustrative of the principles of this invention and various modifications can be made by those skilled in the art without departing from the scope and spirit of the invention. The foregoing embodiments may be implemented individually or in any combination.

What is claimed is:

1. A method, comprising:
    with an electronic device, prompting a user to perform a mechanical gesture with the electronic device, wherein prompting the user to perform the mechanical gesture with the electronic device comprises prompting the user to move the electronic device along a curved path while holding the electronic device at arm's length;
    with at least one camera sensor in the electronic device and during the particular mechanical gesture, capturing image data of an environment around the electronic device;
    with image processing circuitry in the electronic device, identifying lighting characteristics of the environment based on the image data;
    with circuitry in the electronic device, determining imaging settings based on the identified lighting characteristics; and
    with the at least one camera sensor, capturing an image using the determined imaging settings.

2. The method defined in claim 1 wherein the lighting characteristics comprises at least one lighting characteristic selected from the group consisting of:
    a location of a light source, a color temperature of the light source, a color profile of the light source, an intensity of the light source, and a relative velocity of the light source.

3. The method defined in claim 1 wherein the determined imaging settings comprise at least one imaging setting selected from the group consisting of: an auto-white balance setting, an auto-exposure setting, and an auto-focus setting.

4. The method defined in claim 1 wherein prompting the user to perform the mechanical gesture comprises:
    with the electronic device, prompting the user to rotate the electronic device between 180 and 360 degrees.

5. The method defined in claim 1 comprising:
    with location sensing circuitry, determining a location of the electronic device; and
    storing the determined location together with at least one of the captured image data, identified lighting characteristics, and determined imaging settings in nonvolatile storage in the electronic device.

6. The method defined in claim 5 wherein the location sensing circuitry comprises global positioning system circuitry.

* * * * *